United States Patent
Ryu

(10) Patent No.: US 10,887,668 B2
(45) Date of Patent: Jan. 5, 2021

(54) DEVICE AND METHOD FOR PROCESSING EMERGENCY ALERT MESSAGE IN BROADCAST SYSTEM

(71) Applicant: Samsung Electronics Co., Ltd., Suwon-si (KR)

(72) Inventor: Young-Sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/562,686

(22) PCT Filed: Apr. 1, 2016

(86) PCT No.: PCT/KR2016/003415
§ 371 (c)(1),
(2) Date: Sep. 28, 2017

(87) PCT Pub. No.: WO2016/159717
PCT Pub. Date: Oct. 6, 2016

(65) Prior Publication Data
US 2018/0097574 A1    Apr. 5, 2018

(30) Foreign Application Priority Data

Apr. 1, 2015 (KR) .................... 10-2015-0046297
Jul. 14, 2015 (KR) .................... 10-2015-0100075

(51) Int. Cl.
*H04N 21/81* (2011.01)
*H04N 21/488* (2011.01)
(Continued)

(52) U.S. Cl.
CPC .......... *H04N 21/814* (2013.01); *H04H 20/59* (2013.01); *H04H 20/93* (2013.01); *H04H 60/72* (2013.01);
(Continued)

(58) Field of Classification Search
None
See application file for complete search history.

(56) References Cited

U.S. PATENT DOCUMENTS

2003/0220100 A1* 11/2003 McElhatten ..... H04N 21/47214
455/418
2006/0015898 A1*  1/2006 Kim .................... H04N 21/814
725/33
(Continued)

FOREIGN PATENT DOCUMENTS

CN    101686341 A    3/2010
CN    104219551 A    12/2014
(Continued)

OTHER PUBLICATIONS

Chinese Office Action dated Jan. 4, 2019, issued in Chinese Application No. 201680025378.4.
(Continued)

*Primary Examiner* — Ricky Chin
(74) *Attorney, Agent, or Firm* — Jefferson IP Law, LLP

(57) ABSTRACT

The present invention, with respect to a method for processing an EAM (Emergency Alert Message) by means of a PD (Primary Device) in a broadcast system, is characterized by comprising the steps of: generating an event for requesting a search of a CD (Companion Device); generating an event for receiving an EAM from the PD, and requesting that an application in the CD for displaying the received EAM be executed; and transmitting the EAM to the CD.

5 Claims, 13 Drawing Sheets

(51) Int. Cl.
  *H04N 21/2362*    (2011.01)
  *H04N 21/438*     (2011.01)
  *H04N 21/2383*    (2011.01)
  *H04N 21/235*     (2011.01)
  *H04H 20/59*      (2008.01)
  *H04H 20/93*      (2008.01)
  *H04H 60/72*      (2008.01)
  *H04H 60/74*      (2008.01)
  *G08B 27/00*      (2006.01)
  *H04N 21/478*     (2011.01)

(52) U.S. Cl.
  CPC .......... *H04H 60/74* (2013.01); *H04N 21/235* (2013.01); *H04N 21/2362* (2013.01); *H04N 21/2383* (2013.01); *H04N 21/4382* (2013.01); *H04N 21/4882* (2013.01); *G08B 27/008* (2013.01); *H04N 21/478* (2013.01)

(56) References Cited

U.S. PATENT DOCUMENTS

| | | | | |
|---|---|---|---|---|
| 2006/0020964 | A1* | 1/2006 | Yun | H04N 21/814 725/33 |
| 2006/0055527 | A1* | 3/2006 | Pugel | G08B 27/008 340/517 |
| 2007/0083884 | A1* | 4/2007 | Kim | G08B 27/008 725/33 |
| 2007/0118851 | A1* | 5/2007 | Yun | H04N 21/478 725/33 |
| 2008/0111699 | A1* | 5/2008 | Kwon | G08B 27/008 340/601 |
| 2008/0216113 | A1* | 9/2008 | Yun | H04N 21/435 725/33 |
| 2009/0295989 | A1 | 12/2009 | Kang et al. | |
| 2010/0019899 | A1* | 1/2010 | Zhang | G08B 27/005 340/540 |
| 2011/0088058 | A1* | 4/2011 | Velazquez | H04H 20/59 725/33 |
| 2011/0099575 | A1* | 4/2011 | Woo | H04H 20/59 725/33 |
| 2011/0307932 | A1* | 12/2011 | Fan | H04N 21/4786 725/110 |
| 2014/0120861 | A1* | 5/2014 | Kwak | H04H 20/59 455/404.1 |
| 2014/0250456 | A1* | 9/2014 | Ramkumar | H04N 21/814 725/33 |
| 2014/0282704 | A1* | 9/2014 | Tumuluru | H04N 21/814 725/33 |
| 2014/0375764 | A1* | 12/2014 | Choe | H04N 13/161 348/43 |
| 2015/0372775 | A1* | 12/2015 | Kwak | H04H 20/59 455/3.01 |
| 2016/0198241 | A1* | 7/2016 | Kitazato | H04N 21/6112 725/33 |
| 2016/0330525 | A1* | 11/2016 | Freeman | H04W 4/90 |
| 2016/0337449 | A1* | 11/2016 | Yang | H04N 21/4126 |
| 2017/0012725 | A1* | 1/2017 | Lee | H04H 20/59 |
| 2017/0085955 | A1* | 3/2017 | Deshpande | H04N 21/436 |
| 2017/0207867 | A1* | 7/2017 | Kwon | H04W 4/90 |
| 2017/0244992 | A1* | 8/2017 | Deshpande | H04N 21/242 |
| 2017/0250767 | A1* | 8/2017 | Deshpande | H04H 20/08 |
| 2018/0027301 | A1* | 1/2018 | Deshpande | H04N 21/4126 725/88 |
| 2018/0205473 | A1* | 7/2018 | Kitahara | G08B 25/08 |

FOREIGN PATENT DOCUMENTS

| | | |
|---|---|---|
| JP | 2003-348034 A | 12/2003 |
| JP | 2004-336227 A | 11/2004 |
| JP | 2013-196570 A | 9/2013 |
| KR | 10-2008-0042489 A | 5/2008 |
| KR | 10-2009-0123544 A | 12/2009 |
| KR | 10-2014-0041993 A | 4/2014 |
| KR | 10-2014-0135914 A | 11/2014 |
| WO | 2014-119961 A1 | 8/2014 |

OTHER PUBLICATIONS

Chinese Office Action dated Sep. 30, 2019, issued in a counterpart Chinese Application No. 201680025378.4.

* cited by examiner

DEVICE AND METHOD FOR PROCESSING EMERGENCY ALERT MESSAGE IN BROADCAST SYSTEM

PRIORITY

This application is a National Phase Entry of PCT International Application No. PCT/KR2016/003415, which was filed on Apr. 1, 2016, and claims a priority to Korean Patent Application No. 10-2015-0046297, which was filed on Apr. 1, 2015, and Korean Patent Application No. 10-2015-0100075, which was filed on Jul. 14, 2015, the contents of which are incorporated herein by reference.

TECHNICAL FIELD

The present disclosure relates to an apparatus and method for processing an emergency alert message (EAM) in a broadcast system, and more particularly, to an apparatus and method for processing an EAM received from a broadcast system in a multi-screen environment where a plurality of devices are connected.

BACKGROUND ART

Firstly, a structure of a general broadcast system will be described with reference to FIG. 1.

FIG. 1 schematically illustrates a structure of a general broadcast system.

Referring to FIG. 1, the broadcast system includes a broadcast center 111 and a primary device (PD) 113.

The primary device 113 includes an emergency alert (EA) framework 115 as a module for processing an EAM received through a broadcast network. The EA framework 115 is implemented with a simple structure for performing only an operation of receiving an EAM transmitted in the broadcast center 111 and displaying the received EAM on a screen (not shown in FIG. 1) of the PD 113.

In a general broadcast system as described in FIG. 1, the following two situations may occur.

Firstly, if a user of the PD 113 does not watch a broadcast screen, the user may miss an important EAM transmitted through the network.

Secondly, the EAM transmitted through the broadcast network is implemented with a message with a simple text form, so it may not provide the user of the PD 113 with more detailed and specific information.

The above information is presented as background information only to assist with an understanding of the present disclosure. No determination has been made, and no assertion is made, as to whether any of the above might be applicable as prior art with regard to the present disclosure.

DISCLOSURE

Technical Problem

An embodiment of the present disclosure provides an apparatus and method for processing an EAM in a broadcast system.

An embodiment of the present disclosure provides an apparatus and method for processing an EAM in a multi-screen environment where a plurality of devices are connected in a broadcast system.

An embodiment of the present disclosure provides, in a case that a PD receives an EAM through a broadcast network in a multi-screen environment where a plurality of devices are connected, an apparatus and method for transmitting the received EAM to a companion device (CD).

An embodiment of the present disclosure provides, in a case that a primary device capable of receiving a broadcast signal receives an EAM in a multi-screen environment where a plurality of devices are connected, an apparatus and method for transmitting the received EAM to a companion device which may not receive an EAM directly in a broadcast system.

Technical Solution

An embodiment of the present disclosure proposes a primary device (PD) in a broadcast system, comprising a process to generate an event which requests to discover a companion device (CD); generate an event which requests to run an application within the CD which receives an emergency alert message (EAM) from the PD and displays the received EAM; and transmit the EAM to the CD.

An embodiment of the present disclosure proposes a primary device (PD) in a broadcast system, comprising a processor to generate an event which requests to discover a companion device (CD); generate an event which requests to run an application within the CD which receives an emergency alert message (EAM) from the PD and displays the received EAM; and transmit the EAM to a multicast address.

An embodiment of the present disclosure proposes a method for processing an emergency alert message (EAM) by a primary device (PD) in a broadcast system, comprising: generating an event which requests to discover a companion device (CD); generating an event which requests to run an application within the CD which receives an EAM from the PD and displays the received EAM; and transmits the EAM to the CD.

An embodiment of the present disclosure proposes a method for processing an emergency alert message (EAM) by a primary device (PD) in a broadcast system, comprising: generating an event which requests to discover a companion device (CD); generating an event which requests to run an application within the CD which receives an EAM from the PD and displays the received EAM; and transmits the EAM to a multicast address.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to process an EAM in a broadcast system.

An embodiment of the present disclosure enables to process an EAM in a multi-screen environment where a plurality of devices are connected in a broadcast system.

An embodiment of the present disclosure enables to transmit a received EAM to a CD in a case that a PD receives the EAM through a broadcast network in a multi-screen environment where a plurality of devices are connected.

An embodiment of the present disclosure enables to transmit a received EAM to a companion device which may not receive an EAM directly in a broadcast system in a case that a primary device capable of receiving a broadcast signal receives the EAM in a multi-screen environment where a plurality of devices are connected.

An embodiment of the present disclosure enables to display an EAM in another device which is not connected to a broadcast network by transmitting the EAM to a CD in a case of receiving the EAM through the broadcast network in a multi-screen environment where a plurality of devices are connected.

An embodiment of the present disclosure enables to provide detailed and specific information including an image or video through this.

DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
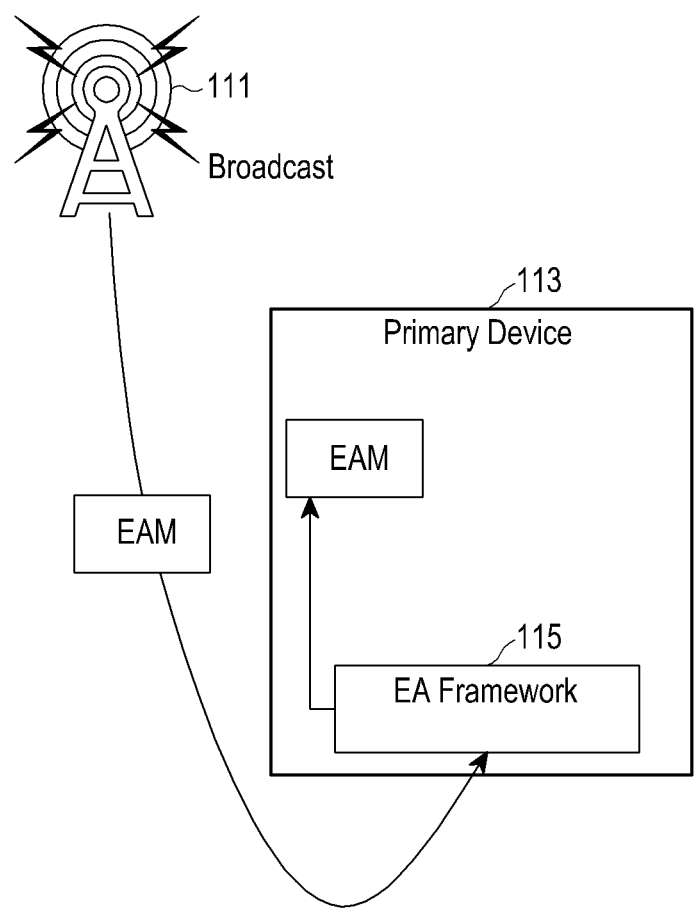
FIG. 1 schematically illustrates a structure of a general broadcast system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a device may be an electronic device.

An embodiment of the present disclosure provides an apparatus and method for processing an emergency alert message (EAM) in a broadcast system.

An embodiment of the present disclosure provides an apparatus and method for processing an EAM in a multi-screen environment where a plurality of devices are connected in a broadcast system.

An embodiment of the present disclosure provides, in a case that a primary device (PD) receives an EAM through a broadcast network in a multi-screen environment where a plurality of devices are connected, an apparatus and method for transmitting the received EAM to a companion device (CD).

An embodiment of the present disclosure provides, in a case that a primary device capable of receiving a broadcast signal receives an EAM in a multi-screen environment where a plurality of devices are connected, an apparatus and method for transmitting the received EAM to a companion device which may not receive an EAM directly in a broadcast system.

An apparatus and method proposed in an embodiment of the present disclosure may be applied to various communication systems such as a digital video broadcast system such as a mobile broadcast service such as a digital multimedia broadcasting (DMB) service, a digital video broadcasting-handheld (DVP-H) service, an advanced television systems committee-mobile/handheld (ATSC-M/H) service, and/or the like, and an internet protocol television (IPTV) service, and/or the like, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rdgeneration partnership project 2 (3GPP2), a wideband code division multiple access (WCDMA) mobile communication system proposed in the 3GPP2, a code division multiple access (CDMA) mobile communication system proposed in the 3GPP2, a communication system such as an institute of electrical and electronics engineers (IEEE) 802.11ac communication system, an IEEE 802.16 communication system, and/or the like, a mobile internet protocol (Mobile IP) system, and/or the like.

An embodiment of the present disclosure defines a specific apparatus and protocol related to an operation of transmitting an EAM received by a PD through a broadcast network to a CD in a broadcast system. In a case that an emergency situation such as an earthquake, a typhoon, and a fire occurs, an important message may be effectively transferred to a user using an operation of transmitting an EAM received by a PD through a broadcast network to a CD in a broadcast system even though the user does not directly watch a device which may receive a broadcast signal such as a television (TV).

So, an embodiment of the present disclosure provides a specific method as the following.

(1) An embodiment of the present disclosure provides a method of transmitting an EAM received by an arbitrary device through a broadcast network to another device which is not connected to the broadcast network in a broadcast system. Here, a device capable of receiving an EAM through a broadcast network may be a PD, and a device which is not connected to the broadcast network may be a CD.

(2) An embodiment of the present disclosure provides a method of providing an EAM including an image or video in a broadcast system.

(3) An embodiment of the present disclosure provides a method of displaying an EAM in a general device in a broadcast system.

So, an embodiment of the present disclosure proposes an apparatus and method capable of transmitting an EAM to devices which may not receive a broadcast signal using a smart device which has recently become more utilized.

A structure of a broadcast system according to an embodiment of the present disclosure will be described with reference to FIG. 2.

Figure 2:
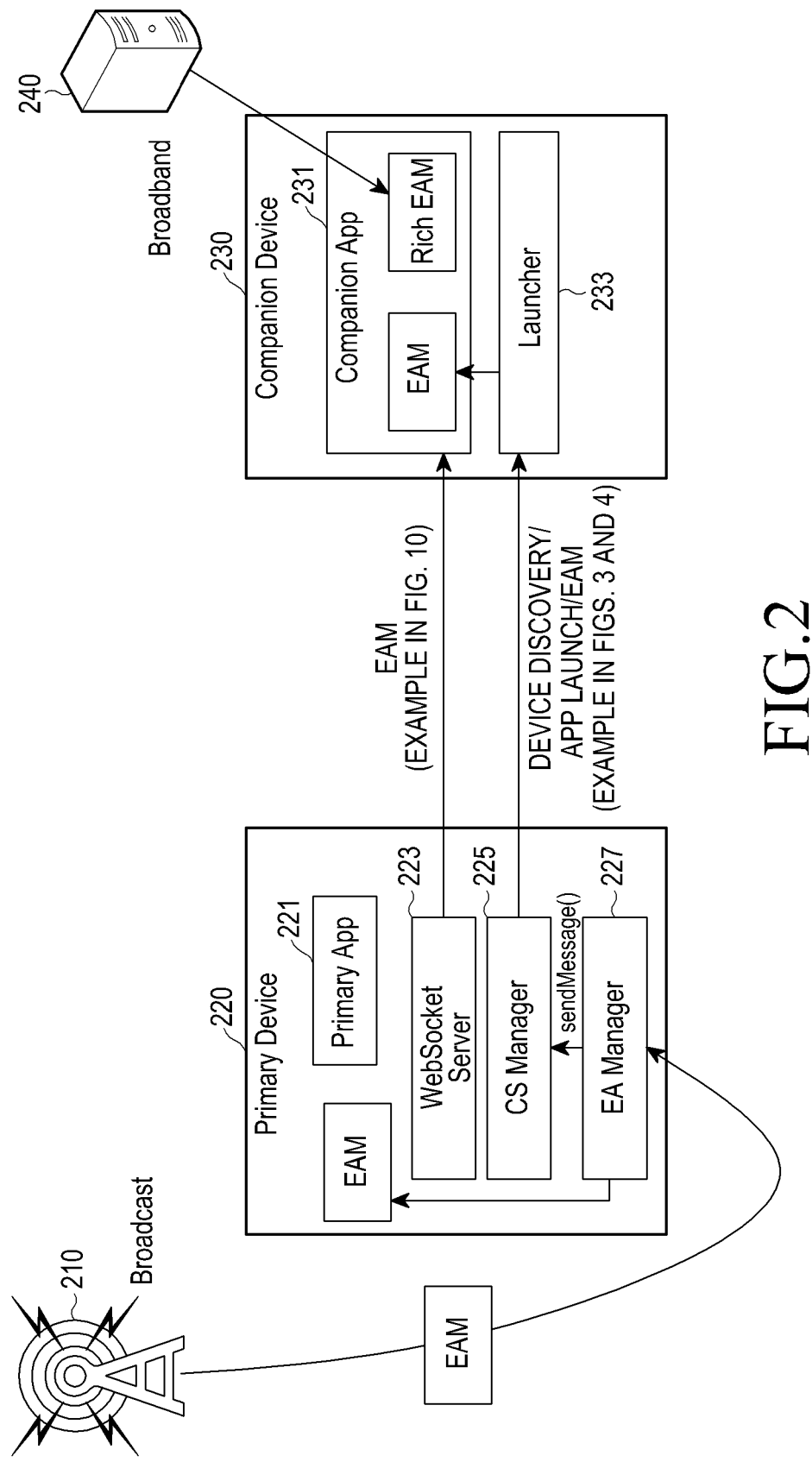
FIG. 2 schematically illustrates a structure of a broadcast system according to an embodiment of the present disclosure.

FIG. 2 schematically illustrates a structure of a broadcast system according to an embodiment of the present disclosure.

Referring to FIG. 2, the broadcast system includes a broadcast center 210, a PD 220, a CD 230, and a web server 240.

The broadcast center 210 transmits a broadcast signal along with an EAM upon detecting that an emergency situation occurs while transmitting a broadcast signal through a broadcast network.

The web server 240 may be a web server in an internet network, and generally, may be operated by the broadcast center 210.

The PD 220 denotes a device capable of receiving a broadcast signal, and generally, denotes a device such as a digital television (DTV), a set top box (STB), and/or the like.

The PD 220 includes a primary application (Primary App) 221, a web socket server 223, a companion screen (CS) manager (hereinafter, "CS Manager") 225, and an emergency alert (EA) manager (hereinafter, "EA Manager") 227. For example, a CS Manager may be referred to as CD manager (hereinafter, "CD Manager"). For example, an EA Manager may be referred to as PD application (hereinafter, PD Application).

The Primary App 221 denotes an application program run in the PD 220.

The web socket server 223 denotes a server which supports a web socket protocol providing an inter-device two-way communication. In an embodiment of the present disclosure, the web socket server 223 is used for transmitting the EAM received by the PD 200 to a companion application (Companion App) 231 included in the CD 230. For example, a Companion App may be referred to as Emergency Alert CD application.

The CS Manager 225 performs an operation required for inter-device interworking. The CS Manager 225 performs a function of discovering an available CD, a function of executing a Companion App included in the discovered CD, and a function of transmitting an EAM received through a broadcast network to the discovered CD.

The EA Manager 227 denotes a module for processing an EAM received through a broadcast network. Generally, if there is no device, e.g., a CD, connected to the PD 220 in the broadcast network, the EA Manager 227 performs an operation of processing the EAM received through the broadcast network and displaying the processed EAM on a screen. On the other hand, if there is the CD connected to the PD 220 in the broadcast network, the EA Manager 227 transfers the EAM to the CD connected to the PD 220 in the broadcast network through the CS Manager 225.

The EA Manager 227 may be implemented with two forms such as a native application and a Web application. For example, if the EA Manager 227 is implemented with the Web application form, the operation of receiving the EAM from the broadcast network, and processing the received EAM on the screen may be implemented with a native application form, and the operation of transferring the EAM to the CD through the CS Manager 225 may be separately implemented with a Web application form.

Further, an EAM may be generally configured with a Text form. In an embodiment of the present disclosure, a rich EAM (hereinafter, "Rich EAM") may include uniform resource identifier (URI) information which access the Rich EAM for processing the Rich EAM.

The CD 230 denotes an assistant device in which an application program is run by interworking with the PD 220. Generally, the CD 230 includes a personal terminal such as a mobile terminal and a tablet.

The CD 230 includes a Companion App 231 and a launcher (hereinafter, "Launcher") 233.

The Companion App 231 denotes an application program executed in the CD 230. The CD 230 does not include an EA Manager which processes an EAM and displays the processed EAM on a screen, so an EAM received from a PD needs to be processed and displayed in the Companion App 231.

The Rich EAM denotes an EAM providing information which is more detailed and specific compared with an EAM which is implemented with a simple text. The Rich EAM generally includes Rich media such as an image and video, and is provided through an internet network.

The Launcher 233 is included in the CD 230 and performs an operation required for inter-device interworking. The Launcher 233 includes a function of responding to discovery if a PD discovers an available CD, and a function of receiving an EAM from the PD and processing the EAM.

While the Primary App 221, the web socket server 223, the CS Manager 225, and the EA Manager 227 are described in the PD 220 as separate modules in FIG. 2, however, the PD 220 may be implemented with one processor, and may be implemented with one module. While the Companion App 231 and the Launcher 233 are described in the CD 230 as separate modules, however, the CD 230 may be implemented with one processor, and may be implemented with one module.

A structure of a broadcast system according to an embodiment of the present disclosure has been described with reference to FIG. 2, and an example of an operation of transmitting an EAM from a PD to a CD in a broadcast system according to an embodiment of the present disclosure will be described with reference to FIG. 3.

Figure 3:
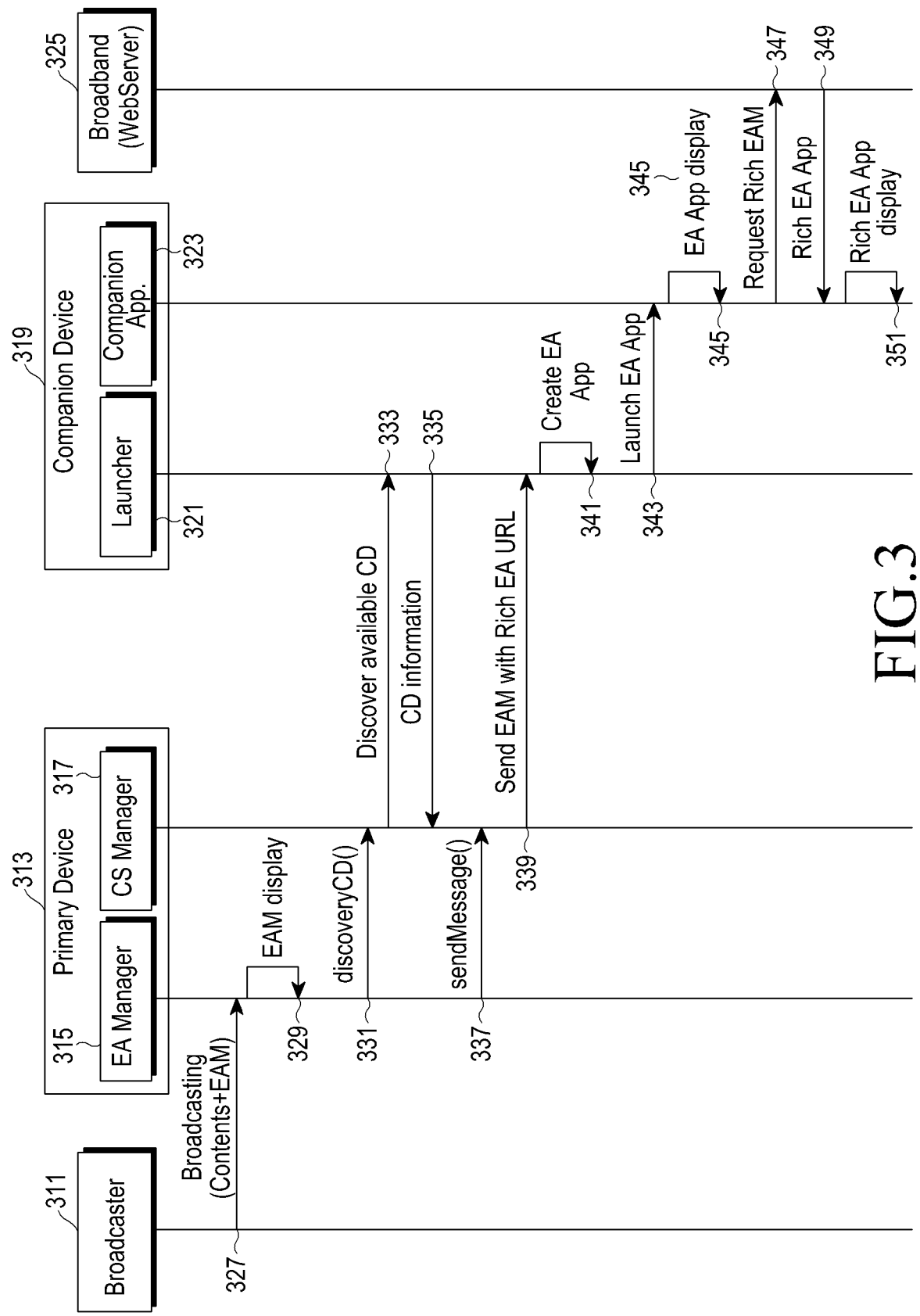
FIG. 3 schematically illustrates an example of an operation of transmitting an EAM from a PD to a CD in a broadcast system according to an embodiment of the present disclosure.

FIG. 3 schematically illustrates an example of an operation of transmitting an EAM from a PD to a CD in a broadcast system according to an embodiment of the present disclosure.

Referring to FIG. 3, the broadcast system includes a broadcast center 311, a PD 313, a CD 319, and a web server 325. The PD 313 includes the EA Manager 315 and a CS Manager 317, and the CD 319 includes a Launcher 321 and a Companion App 323.

The broadcast center 311 transmits broadcast contents and an EAM, and the PD 313 receives the broadcast contents and the EAM from the broadcast center 311 through the EM Manager 315 (at operation 327).

After receiving the broadcast contents and the EAM, the EM Manager 315 of the PD 313 displays the received EAM on a screen of the PD 313 (at operation 329).

The PD 313 discovers whether there is a CD connected to the PD 313. A process of discovering whether there is the CD connected to the PD 313 will be described below.

The EM Manager 315 of the PD 313 requests the CS Manager 317 of the PD 313 to discover a CD through a discoveryCD( ) as a CD discovery application program interface (API) (at operation 331). For example, the EA Manager 315 may request to discover the CD through the discoveryCD( ) by generating an event of requesting the CD through the discoveryCD( ). The discoveryCD( ) as the CD discovery API will be described with reference to Table 1, and a detailed description thereof will be omitted herein.

After receiving the request for discovering the CD through the discoveryCD( ) from the EM Manager 315 of the PD 313, the CS Manager 317 of the PD 313 performs an operation of discovering an available CD within the broadcast network. That is, the CS Manager 317 of the PD 313 transmits a Discovery available CD message to the CD 319 (at operation 333), and the Launcher 321 of the CD 319 transmits a CD Information message as a response message to a Discovery available CD message to the PD 313 after receiving the Discovery available CD message from the CS Manager 317 of the PD 313 (at operation 335).

Meanwhile, a process from operation 331 to operation 335 may be performed previously. That is, if the PD 313 and the CD 319 are paired each other, the process from operation 331 to operation 335 may be omitted.

The EA Manager 315 of the PD 313 transfers the EAM received from the broadcast center 311 to the CS Manager 317 of the PD 313 (at operation 337). Here, the EA Manager 315 of the PD 313 transfers the EAM received from the broadcast center 311 to the CS Manager 317 of the PD 313 through a sendMessage( ). Here, the sendMessage( ) is an API provided in the CS Manager 315 of the PD 313. The sendMessage( ) will be described with reference to Table 1, and a detailed description thereof will be omitted herein.

After receiving the EAM from the EA Manager 315 of the PD 313, the CS Manager 317 of the PD 313 transmits the EAM transferred from the EA Manager 315 of the PD 313 to the CD 319 (at operation 339). Here, the CS Manager 317 of the PD 313 transmits the EAM along with a Rich EA uniform resource locator (URL) to the CD 319. A specific method of transmitting the EAM along with the Rich EA URL from the CS Manager 317 of the PD 313 to the CD 319 will be described with reference to Table 2, and a detailed description thereof will be omitted herein.

After receiving the EAM transmitted by the CS Manager 317 of the PD 313, the Launcher 321 of the CD 319 generates an application (App) capable of displaying the EAM (at operation 341), and runs the generated App (at operation 143). A method of generating the App in the Launcher 321 of the CD 319 will be described with reference to FIG. 5, and a detailed description thereof will be omitted herein.

The Companion App 323 of the CD 319 runs the APP generated by the Launcher 321 of the CD 319 and displays the received EAM (at operation 345).

Upon detecting that a user of the CD 319 requests a Rich EAM through an EAM, the Companion App 323 of the CD 319 transmits a Request Rich EAM message which requests a Rich EAM to the web server 325 (at operation 347). Here, the Rich EAM includes multimedia contents such as an image, video, and/or the like, and may be provided as an App form which is configured with a hyper text markup language (HTML). After receiving the Request Rich EAM message from the Companion App 323 of the CD 319, the web server 325 generates a requested Rich EAM as an App form, and transmits the Rich EA App to the Companion App 323 of the CD 319 (at operation 349).

After receiving the Rich EA App from the web server 325, the Companion App 323 of the CD 319 displays the Rich EA App (at operation 351).

A discoveryCD( ) and a sendMessage( ) as APIs used for transmitting the EAM will be described with reference to Table 1.

TABLE 1

| API | Description | Input Parameter | Output Parameter |
|---|---|---|---|
| disocoveryCD(void) | Get a list of an available CD from a broadcast network | No | In case of success: Device list In case of failure: Null |
| sendMessage(int enum_id, string payload) | Transmit an EAM to a CD | int enum_id: Target CD ID string payload: Payload parameter string of an EAM to be transmitted | In case of success: True In case of failure: False |

Meanwhile, a payload format of Table 1 is expressed as Table 2.

Table 2 describes a payload format with a JavaScript Object Notation (JSON) type, however, the payload format may be implemented with various types such as an eXtensible markup language (XML), a general text stream, and/or the like, not the JSON form. An embodiment of the present disclosure focuses on which information needs to be transferred in the payload format rather than the implementation type of the payload format.

TABLE 2

{
   "EAMID" : "Identifier of the Emergency Alert Message",
   "message" : "Emergency Alert Message String",
"Rich_URL" : "Rich EAM URL",
"TimeStamp" : "TimeStamp of the emergency alert message was fired",
"ExpiredTimeStamp" : "TimeStamp of EAM is valid",
"priority" : "The priority of EAM"
}

In Table 2, 'EAMID' indicates a unique identifier (ID) of an EAM.

In Table 2, 'message' indicates a text stream of a message to be transmitted to a CD. In an embodiment of the present disclosure, an EAM received through a broadcast network is included in the 'message'.

In Table 2, 'Rich URL' indicates a URI showing a more detailed and specific EAM, i.e., a Rich EAM. The Rich EAM generally includes Rich media such as an image and a video, and may be provided through an internet network since the Rich EAM is implemented with an HTML.

In Table 2, 'TimeStamp' indicates a date and time which an EAM is issued.

In Table 2, 'ExpiredTimeStamp' indicates a date and time during which an EAM is available. If a CD receives the EAM after the date and time elapse, the CD may ignore the EAM without displaying the EAM.

In Table 2, 'priority' indicates a priority of an EAM. If an EAM with a priority higher than a priority of an EAM which has been displayed already when there is the EAM which has been displayed already, the EAM with the higher priority needs to be displayed on the EAM which has been displayed already.

Although FIG. 3 illustrates an example of an operation of transmitting an EAM from a PD to a CD in a broadcast system according to an embodiment of the present disclosure, various changes could be made to FIG. 3. For example, although shown as a series of operations, various operations in FIG. 3 could overlap, occur in parallel, occur in a different order, or occur multiple times.

An example of an operation of transmitting an EAM from a PD to a CD in a broadcast system according to an embodiment of the present disclosure has been described with reference to FIG. 3, and another example of an operation of transmitting an EAM from a PD to a CD in a broadcast system according to an embodiment of the present disclosure will be described with reference to FIG. 4.

Figure 4:
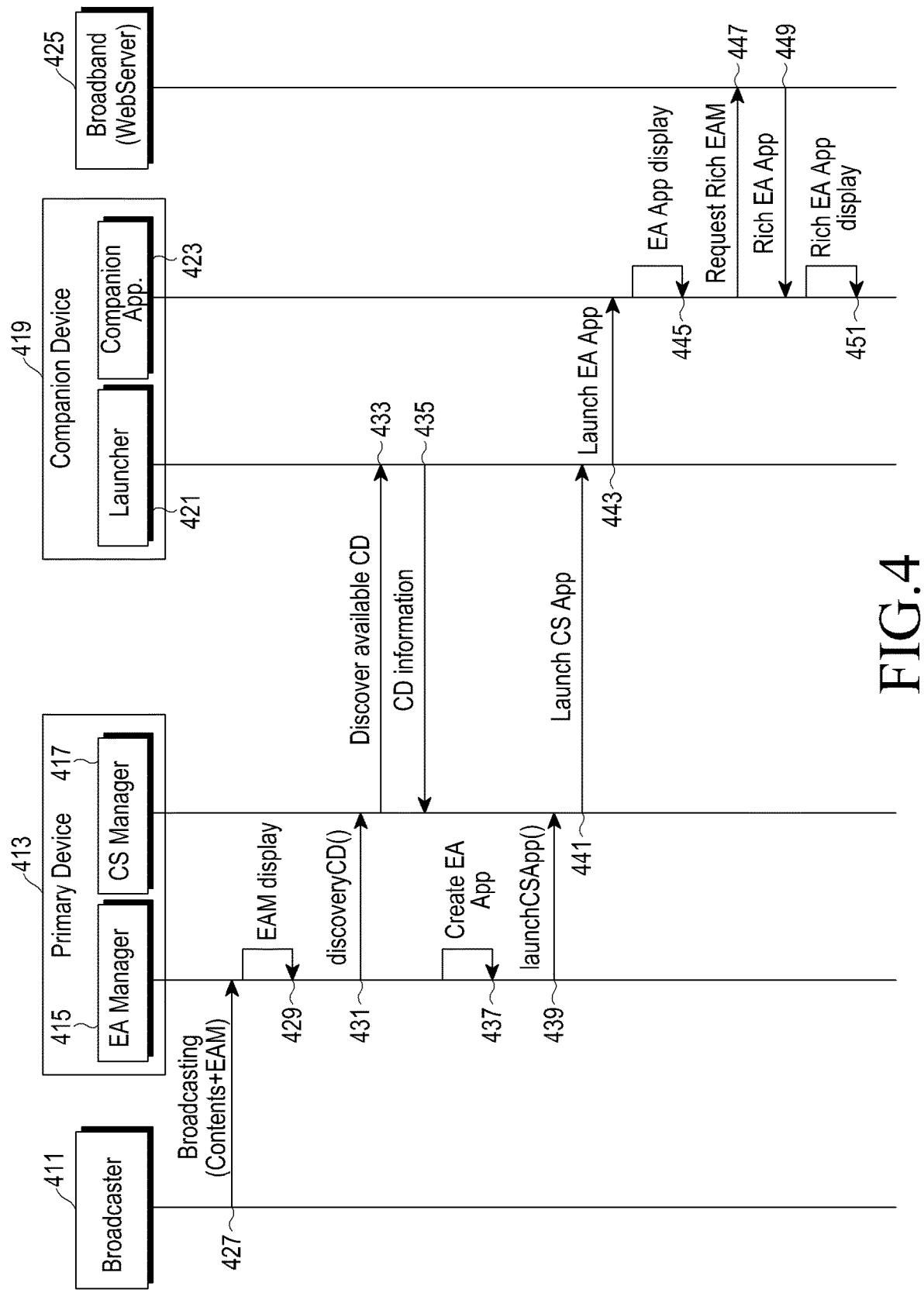
FIG. 4 schematically illustrates another example of an operation of transmitting an EAM from a PD to a CD in a broadcast system according to an embodiment of the present disclosure.

FIG. 4 schematically illustrates another example of an operation of transmitting an EAM from a PD to a CD in a broadcast system according to an embodiment of the present disclosure.

operation of requesting to the CS Manager 417 of the PD 413 that the CD 419 runs the EA App in the EA Manager 415 of the PD 413 may be implemented with an API such as a launchCSApp( ). The launchCSApp( ) will be described with reference to Table 3, and a detailed description thereof will be omitted herein.

In this case, an API may be paged with two forms.

The first form is a method of storing the generated EA App(HTML) in a file system of the PD 413 and transferring only a URI for the EA App(HTML) since the PD 413 supports the web server 425.

The second form is a method of transferring the generated EA App(HTML) to the CD 419.

After receiving the request to run the EA App in the CD 419 through the launchCSApp( ) the CS Manager 417 of the PD 413 transmits request for running of the EA App to the Launcher 421 of the CD 410 (at operation 441).

So, operations 443 to 451 in FIG. 4 are identical to operations 343 to 351 in FIG. 3, so a detailed description thereof will be omitted.

Meanwhile, the launchCSApp( ) may be expressed as Table 3.

TABLE 3

| API | Description | Input parameter | Output Parameter |
|---|---|---|---|
| launchCSApp(uint target_device, char * Payload) | Transmit information of an application program to be run in a CD | uint target_device: ID of a target CD char * Payload: Information of an application program to be run in a CD | In a case of success: True In a case of failure: False |
| launchCSApp (uint target_device, char * HTML) | Transmit an HTML file of an application program to be run in a CD | uint target_device: ID of a target CD char * HTML: HTML file of an application program to be run in a CD | In a case of success: True In a case of failure: False |

Referring to FIG. 4, the broadcast system includes a broadcast center 411, a PD 413, a CD 419, and a web server 425. The PD 413 includes the EA Manager 415 and a CS Manager 417, and the CD 419 includes a Launcher 421 and a Companion App 423.

Firstly, an EAM transmitting operation described in FIG. 3 and an EAM transmitting operation described in FIG. 4 are the same in an aspect of transmitting an EAM from a PD to a CD, however, there is a difference in an aspect that an EA Manager of a PD transmits an EAM received through a broadcast network to a Launcher of a CD and the Launcher of the CD generates an EA App in FIG. 3, and an EA Manager of a PD generates an EA App to be displayed in a CD using an EAM to be displayed in the CD and transmits the generated EAM App to a Launcher of the CD in FIG. 4.

So, operations 427 to 435 in FIG. 4 are identical to operations 327 to 335 in FIG. 3, so a detailed description of operations 427 to 435 will be omitted.

The EA Manager 415 of the PD 413 generates an EA App to be transmitted to the CD 419 using the EAM received from the broadcast center 411 at operation 427 (at operation 437). Here, the EA App is, for example, an HTML code including the received EAM. A method of generating the HTML code including the received EAM will be described with reference to FIG. 5, and a detailed description thereof will be omitted herein.

After generating the EA App, the EA Manager 415 of the PD 413 requests to the CS Manager 417 of the PD 413 that the CD 419 runs the EA App (at operation 439). Here, an Although FIG. 4 illustrates another example of an operation of transmitting an EAM from a PD to a CD in a broadcast system according to an embodiment of the present disclosure, various changes could be made to FIG. 4. For example, although shown as a series of operations, various operations in FIG. 4 could overlap, occur in parallel, occur in a different order, or occur multiple times.

Another example of an operation of transmitting an EAM from a PD to a CD in a broadcast system according to an embodiment of the present disclosure has been described with reference to FIG. 4, and an operation of generating an EA App with an HTML type in a broadcast system according to an embodiment of the present disclosure will be described with reference to FIG. 5.

Figure 5:
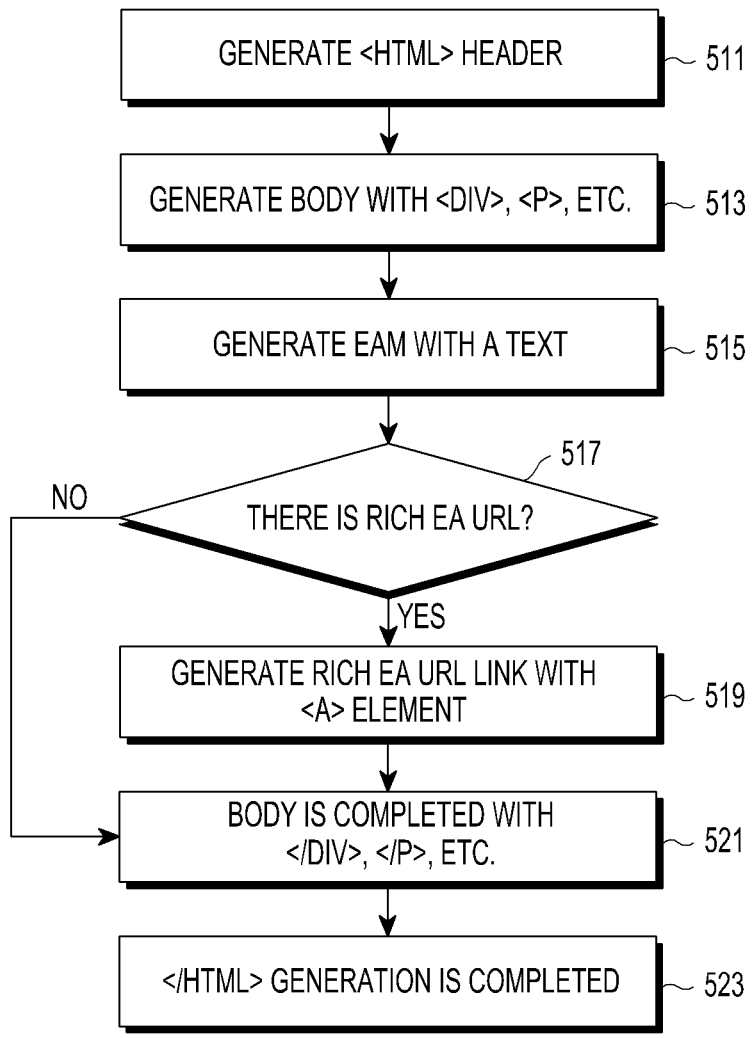
FIG. 5 schematically illustrates an operation of generating an EA App with an HTML type in a broadcast system according to an embodiment of the present disclosure.

FIG. 5 schematically illustrates an operation of generating an EA App with an HTML type in a broadcast system according to an embodiment of the present disclosure.

Referring to FIG. 5, an entity which wants to generate an EA App, e.g., an EA Manager 415 of a PD 413 in FIG. 4 generates a <html> header for HTML file configuration at operation 511, and proceeds to operation 513.

The EA Manager 415 of the PD 413 generates a body which will include an EAM using a <div> or <p> element at operation 513, and proceeds to operation 515.

The EA Manager 415 of the PD 413 displays the EAM on a screen by inserting the EAM into the element generated at operation 513, and proceeds to operation 517.

The EA Manager 415 of the PD 413 determines whether there is a Rich EA URL at operation 517.

If there is the Rich EA URL, the EA Manager 415 of the PD 413 proceeds to operation 519. The EA Manager 415 of the PD 413 generates an <a> element in order to link a Rich EA at operation 519, and proceeds to operation 521. Here, the EA Manager 415 of the PD 413 closes an </a> element after generating the Rich EA URL.

If there is no Rich EA URL at operation 517, the EA Manager 415 of the PD 413 proceeds to operation 521.

The EA Manager 415 of the PD 413 completes a body generating process by generating <div> and </p> elements in order to pair with operation 313 at operation 521, and proceeds to operation 523.

The EA Manager 415 of the PD 413 generates an </html> element at operation 523, so EA App generation is completed.

Although FIG. 5 illustrates an operation of generating an EA App with an HTML type in a broadcast system according to an embodiment of the present disclosure, various changes could be made to FIG. 5. For example, although shown as a series of operations, various operations in FIG. 5 could overlap, occur in parallel, occur in a different order, or occur multiple times.

An operation of generating an EA App with an HTML type in a broadcast system according to an embodiment of the present disclosure has been described with reference to FIG. 5, and an example of an operating process of a PD in a broadcast system according to an embodiment of the present disclosure will be described with reference to FIG. 6.

Figure 6:
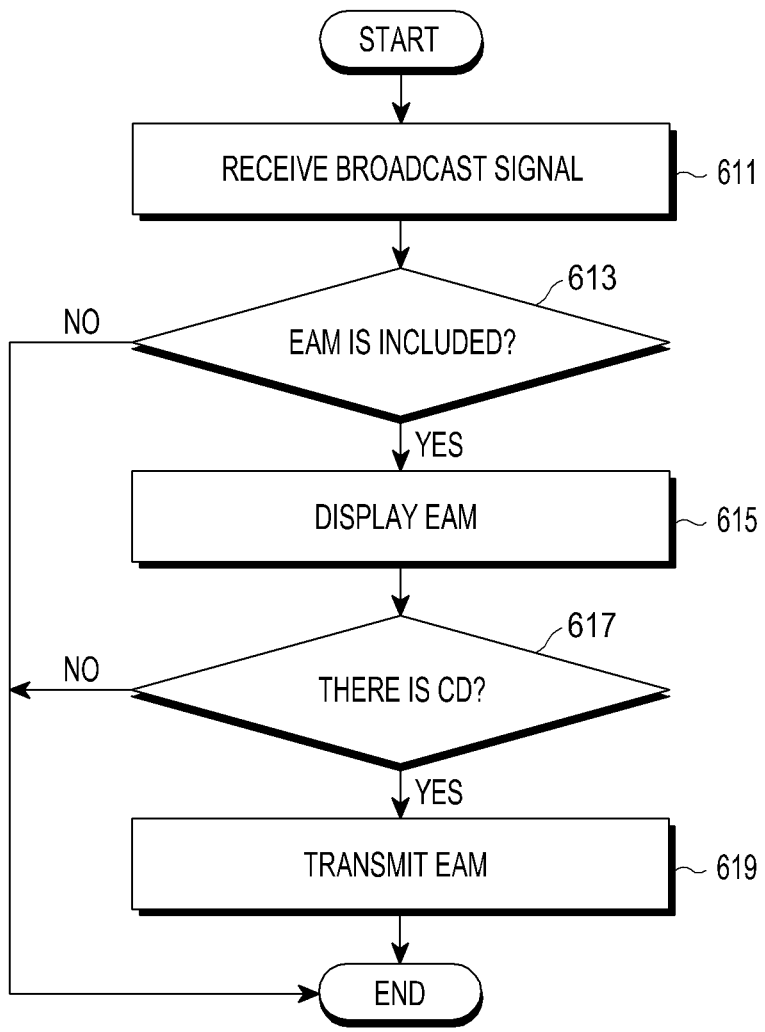
FIG. 6 schematically illustrates an example of an operating process of a PD in a broadcast system according to an embodiment of the present disclosure.

FIG. 6 schematically illustrates an example of an operating process of a PD in a broadcast system according to an embodiment of the present disclosure.

Referring to FIG. 6, it will be noted that an operating process of a PD in FIG. 6 is an operating process of a PD 313 in FIG. 3.

Firstly, a PD receives a broadcast signal transmitted from a broadcast center through a broadcast network at operation 611, and proceeds to operation 613.

The PD determines whether an EAM is included in the received broadcast signal at operation 613.

If the EAM is included in the received broadcast signal, the PD proceeds to operation 615. The PD displays the EAM included in the broadcast signal on a screen at operation 615, and proceeds to operation 617.

If the EAM is not included in the received broadcast signal at operation 613, this operating process is terminated.

Meanwhile, the PD determines whether there is an available CD on the broadcast network at operation 617.

If there is the available CD, the PD proceeds to operation 619. The PD transmits the EAM received from the broadcast center to the CD at operation 619.

If there is no available CD at operation 617, this operating process is terminated.

Although FIG. 6 illustrates an example of an operating process of a PD in a broadcast system according to an embodiment of the present disclosure, various changes could be made to FIG. 6. For example, although shown as a series of operations, various operations in FIG. 6 could overlap, occur in parallel, occur in a different order, or occur multiple times.

An example of an operating process of a PD in a broadcast system according to an embodiment of the present disclosure has been described with reference to FIG. 6, and another example of an operating process of a PD in a broadcast system according to an embodiment of the present disclosure will be described with reference to FIG. 7.

Figure 7:
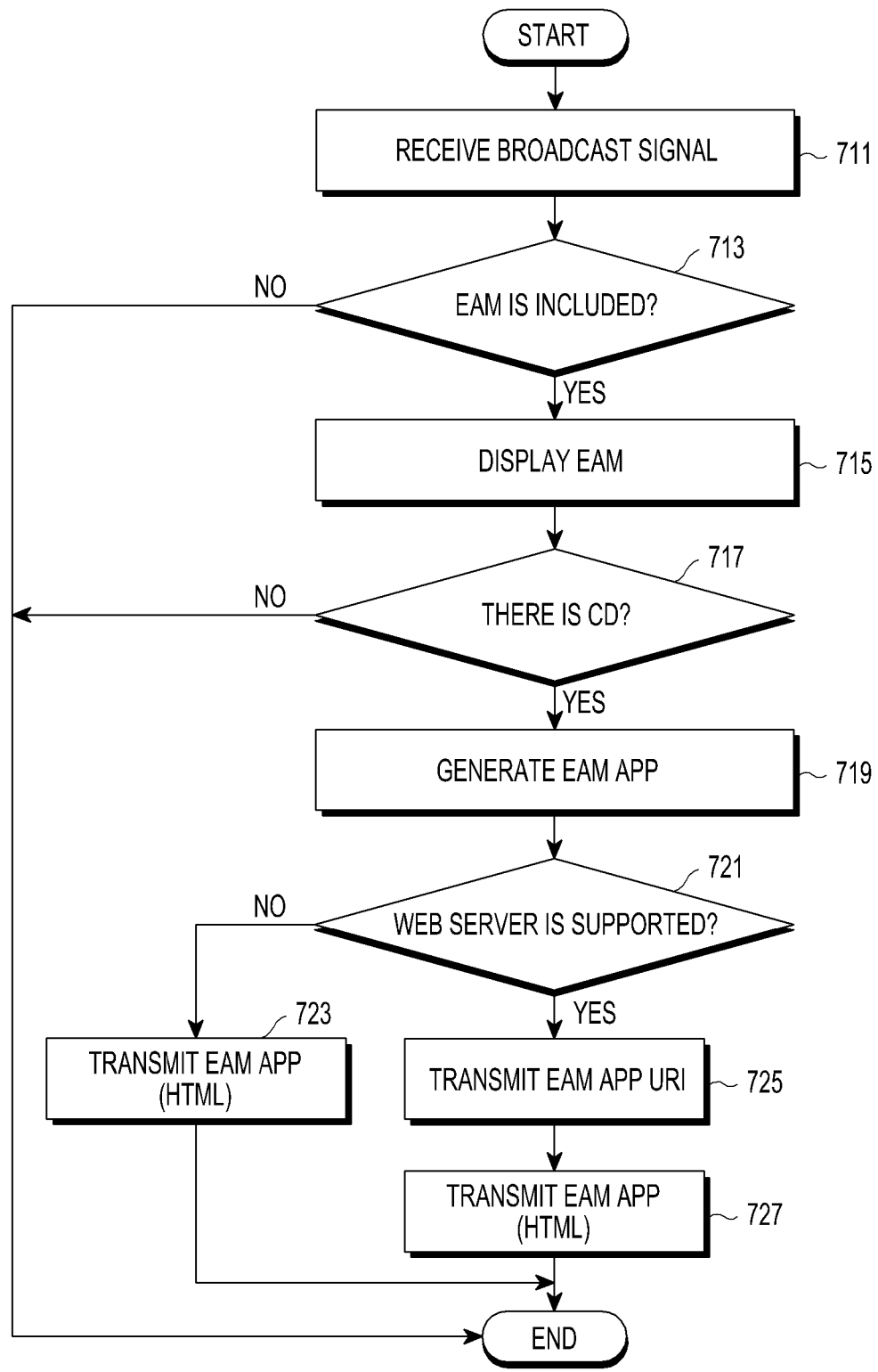
FIG. 7 schematically illustrates another example of an operating process of a PD in a broadcast system according to an embodiment of the present disclosure.

FIG. 7 schematically illustrates another example of an operating process of a PD in a broadcast system according to an embodiment of the present disclosure.

Referring to FIG. 7, it will be noted that an operating process of a PD in FIG. 7 is an operating process of a PD 413 in FIG. 4.

Further, an operating process from operation 711 to operation 717 in FIG. 7 is identical to an operating process from operation 611 to operation 617 in FIG. 6, and a detailed description thereof will be omitted herein.

If there is an available CD on the broadcast network at operation 717, the PD proceeds to operation 719. The PD generates an EA App using the EAM received from the broadcast center at operation 719, and proceeds to operation 721.

If there is no available CD on the broadcast network at operation 717, this operating process is terminated.

Meanwhile, the PD determines whether to support a web server at operation 721.

If the PD does not support the web server, the PD proceeds to operation 723. The PD transmits the EA App (HTML) generated at operation 719 to a CD at operation 723.

If the PD supports the web server at operation 721, the PD proceeds to operation 725. The PD stores the EA App (HTML) generated at operation 719 in a file system of the PD, and transmits only a URI for the EA App(HTML) to the CD at operation 725, and proceeds to operation 727.

Upon receiving EA App transmission request from the CD, the PD transmits the EA App(HTML) to the CD at operation 727.

Although FIG. 7 illustrates another example of an operating process of a PD in a broadcast system according to an embodiment of the present disclosure, various changes could be made to FIG. 7. For example, although shown as a series of operations, various operations in FIG. 7 could overlap, occur in parallel, occur in a different order, or occur multiple times.

Another example of an operating process of a PD in a broadcast system according to an embodiment of the present disclosure has been described with reference to FIG. 7, and an example of an operating process of a CD in a broadcast system according to an embodiment of the present disclosure will be described with reference to FIG. 8.

Figure 8:
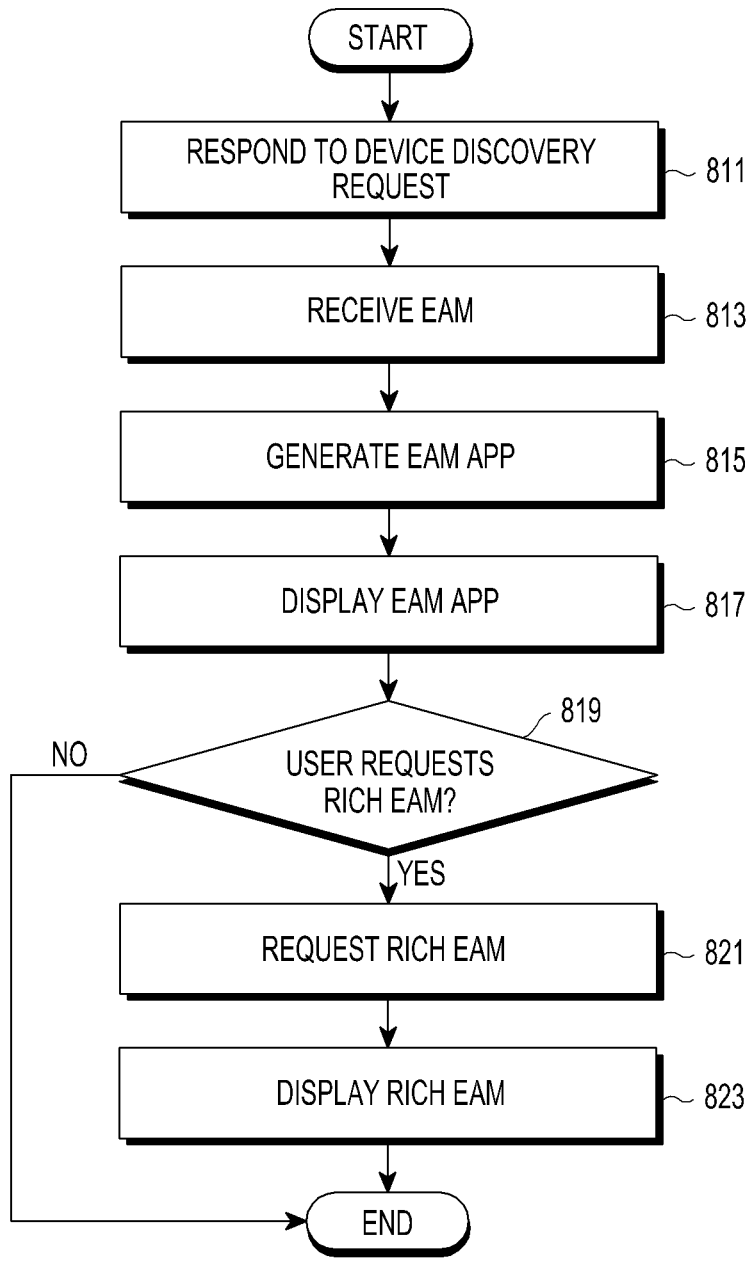
FIG. 8 schematically illustrates an example of an operating process of a CD in a broadcast system according to an embodiment of the present disclosure.

FIG. 8 schematically illustrates an example of an operating process of a CD in a broadcast system according to an embodiment of the present disclosure.

Referring to FIG. 8, it will be noted that an operating process of a CD in FIG. 8 is an operating process of a CD 319 in FIG. 3.

Firstly, a CD receives a device discovery request from a PD, and responds to the device discovery request from the PD by transmitting a CD Information message to the PD if the CD is available at operation 811, and proceeds to operation 813.

The CD receives an EAM from the PD at operation 813, and proceeds to operation 815.

The CD generates an EA App using the received EAM at operation 815, and proceeds to operation 817.

The CD displays the generated EA App at operation 817, and proceeds to operation 819.

The CD determines whether a user of the CD requests a Rich EAM through the EA App at operation 819.

Upon detecting that the user of the CD requests the Rich EAM, the CD proceeds to operation 821. The CD requests a Rich EAM from a web server at operation 821, and proceeds to operation 823.

The CD receives a Rich EAM from the web server and displays the Rich EAM at operation 823.

Although FIG. 8 illustrates an example of an operating process of a CD in a broadcast system according to an embodiment of the present disclosure, various changes could be made to FIG. 8. For example, although shown as a series of operations, various operations in FIG. 8 could overlap, occur in parallel, occur in a different order, or occur multiple times.

An example of an operating process of a CD in a broadcast system according to an embodiment of the present disclosure has been described with reference to FIG. 8, and another example of an operating process of a CD in a broadcast system according to an embodiment of the present disclosure will be described with reference to FIG. 9.

Figure 9:
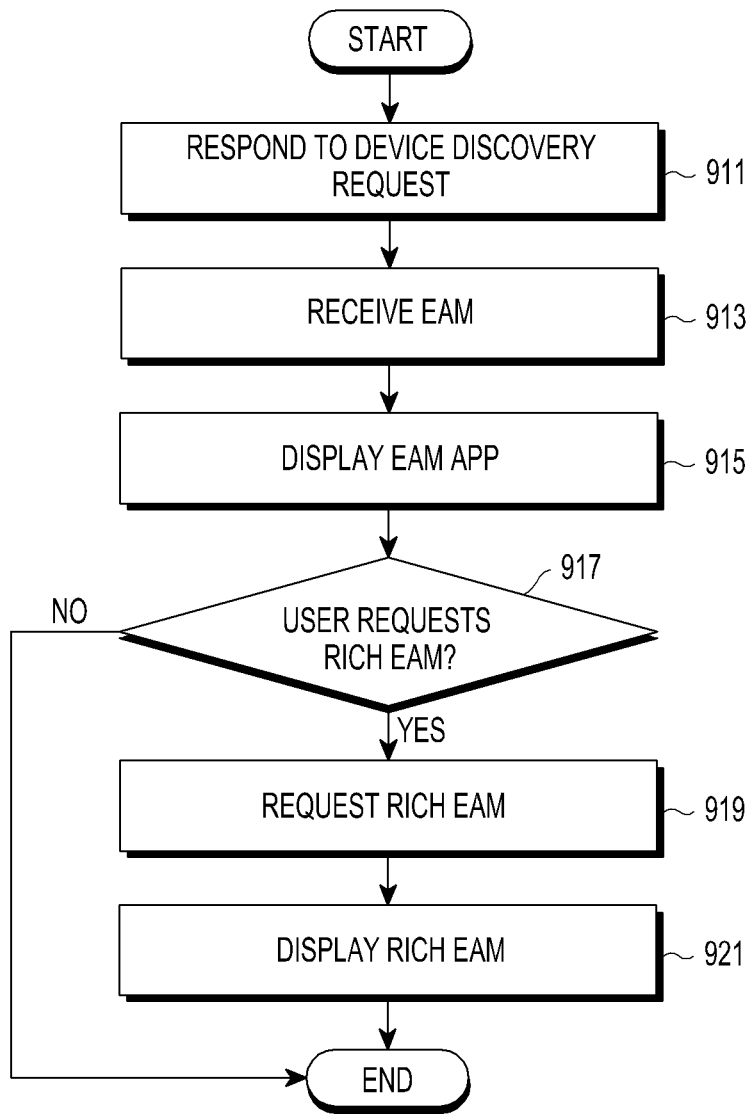
FIG. 9 schematically illustrates another example of an operating process of a CD in a broadcast system according to an embodiment of the present disclosure.

FIG. 9 schematically illustrates another example of an operating process of a CD in a broadcast system according to an embodiment of the present disclosure.

Referring to FIG. 9, it will be noted that an operating process of a CD in FIG. 9 is an operating process of a CD 419 in FIG. 4.

Further, an operating process of operation 911, and operations 915 to operation 921 in FIG. 9 is identical to an operating process of operation 811, and operations 817 to operation 823 in FIG. 8, and a detailed description thereof will be omitted herein.

That is, unlike an operating process of a CD in FIG. 8, in an operating process of a CD in FIG. 9, a CD receives an EA App, not an EAM from a PD (at operation 913), so there is no need for performing an operation of receiving an EAM and generating an EA App of operations 813 and 815 in FIG. 8.

Although FIG. 9 illustrates another example of an operating process of a CD in a broadcast system according to an embodiment of the present disclosure, various changes could be made to FIG. 9. For example, although shown as a series of operations, various operations in FIG. 9 could overlap, occur in parallel, occur in a different order, or occur multiple times.

Another example of an operating process of a CD in a broadcast system according to an embodiment of the present disclosure has been described with reference to FIG. 9, and still another example of an operation of transmitting an EAM from a PD to a CD in a broadcast system according to an embodiment of the present disclosure will be described with reference to FIG. 10.

Figure 10:
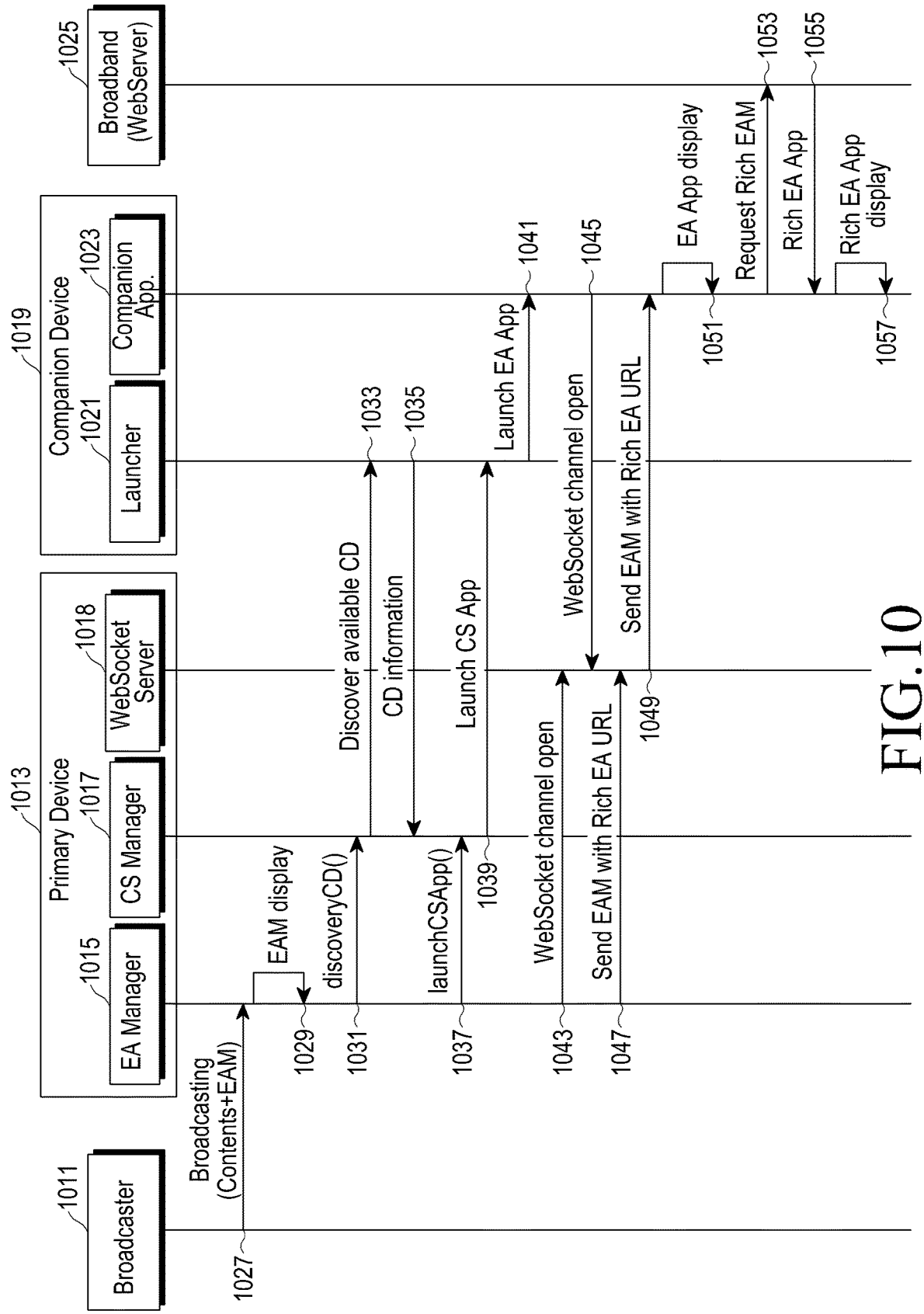
FIG. 10 schematically illustrates still another example of an operation of transmitting an EAM from a PD to a CD in a broadcast system according to an embodiment of the present disclosure.

FIG. 10 schematically illustrates still another example of an operation of transmitting an EAM from a PD to a CD in a broadcast system according to an embodiment of the present disclosure.

Referring to FIG. 10, the broadcast system includes a broadcast center 1011, a PD 1013, a CD 1019, and a web server 1025. The PD 1013 includes the EA Manager 1015, a CS Manager 1017, and a web socket server 1018, and the CD 1019 includes a Launcher 1021 and a Companion App 1023.

Firstly, in an operation of transmitting an EAM from a PD to a CD as described in FIG. 3 and an operation of transmitting an EAM from a PD to a CD as described in FIG. 4, a CS Manager of a PD directly transmits an EAM to a Launcher of a CD, however, in an operation of transmitting an EAM from a PD to a CD as described in FIG. 10, a PD transmits an EAM through a web socket server of a PD, and this will be described below.

Firstly, operations 1027 to 1035 in FIG. 10 are identical to operations 327 to 335 in FIG. 3, and a detailed description of operations 1027 to 1035 will be omitted herein.

Meanwhile, the EA Manager 1015 of the PD 1013 requests the CS Manager 1017 of the PD 1013 to run Companion App 1023 of the CD 1019 based on information for the CD 1019 included in a CD information message received from the Launcher 1021 of the CD 1019 (at operation 1037). For example, the EA Manager 1015 of the PD 1013 may generate an event of requesting the CS Manager 1017 to run the Companion App 1023 of the CD 1019. Here, the EA Manager 1015 of the PD 1013 may request the CS Manager 1017 of the PD 1013 to run the Companion App 1023 of the CD 1019 using an API such as a launchCSApp( ) the launchCSApp( ) has been described with reference to Table 3, and a detailed description thereof will be omitted herein.

After receiving the request for running of the Companion App 1023 of the CD 1019 from the EA Manager 1015 of the PD 1013 through the launchCSApp( ) the CS Manager 1017 of the PD 1013 requests the Launcher 1021 of the CD 1019 to run an EA App (at operation 1039). After receiving the request for running of the EA App from the CS Manager 1017 of the PD 1013, the Launcher 1021 of the CD 1019 requests the Companion App 1023 of the CD 1019 to run the EA App (at operation 1041).

Meanwhile, the EA Manager 1015 of the PD 1013 transmits WebSocket channel open message requesting for generation of a web socket channel to the web socket server 1018 of the PD 1013 (at operation 1043). The EA Manager 1015 of the PD 1013 may generate an event of transmitting the WebSocket channel open message to the web socket server 1018 of the PD 1013.

Like this, the Companion App 1023 of the CD 1019 also transmits a WebSocket channel open message requesting for generation of a web socket channel to the web socket server 1018 of the PD 1013 (at operation 1045).

The web socket channel generated through operations 1043 and 1045 is used for transmitting the EAM from the PD 1013 to the Companion App 1023 of the CD 1019.

Meanwhile, the EA Manager 1015 of the PD 1013 transfers the EAM received from the broadcast center 1011 along with a Rich EA URL to the web socket server 1018 of the PD 1013 (at operation 1047).

After receiving the EAM and the Rich EA URL from the EA Manager 1015 of the PD 1013, the web socket sever 1018 transmits the received EAM and Rich EA URL to the Companion App 1023 of the CD 1019 (at operation 1049). So, the Companion App 1023 of the CD 1019 receives the EAM and the Rich EA URL from the web socket sever 1018.

The Companion App 1023 of the CD 1019 displays the EAM on a screen of the CD 1019 (at operation 1051).

Firstly, operations 1053 to 1057 in FIG. 10 are identical to operations 347 to 351 in FIG. 3, and a detailed description of operations 1053 to 1057 will be omitted herein.

Meanwhile, the EAM transferred through the web socket server 1018 of the PD 1013 may be the same as a form in Table 2.

Although FIG. 10 illustrates still another example of an operation of transmitting an EAM from a PD to a CD in a broadcast system according to an embodiment of the present disclosure, various changes could be made to FIG. 10. For example, although shown as a series of operations, various operations in FIG. 10 could overlap, occur in parallel, occur in a different order, or occur multiple times.

Still another example of an operation of transmitting an EAM from a PD to a CD in a broadcast system according to an embodiment of the present disclosure has been described with reference to FIG. 10, and still another example of an operation of transmitting an EAM from a PD to a CD in a broadcast system according to an embodiment of the present disclosure will be described with reference to FIG. 11.

eamurl="192.168.1.11:992/atsc/EAM" into a parameter transferred from a launchCSApp( ) as described in Table 3.

TABLE 4

```
{
"launch" : [
    {"launchUrl":
eam://com.eammessage?colour=blue&eamurl="192.168.1.11:992/atsc/EAM",
"appType": "native"}
]
}
```

Figure 11:
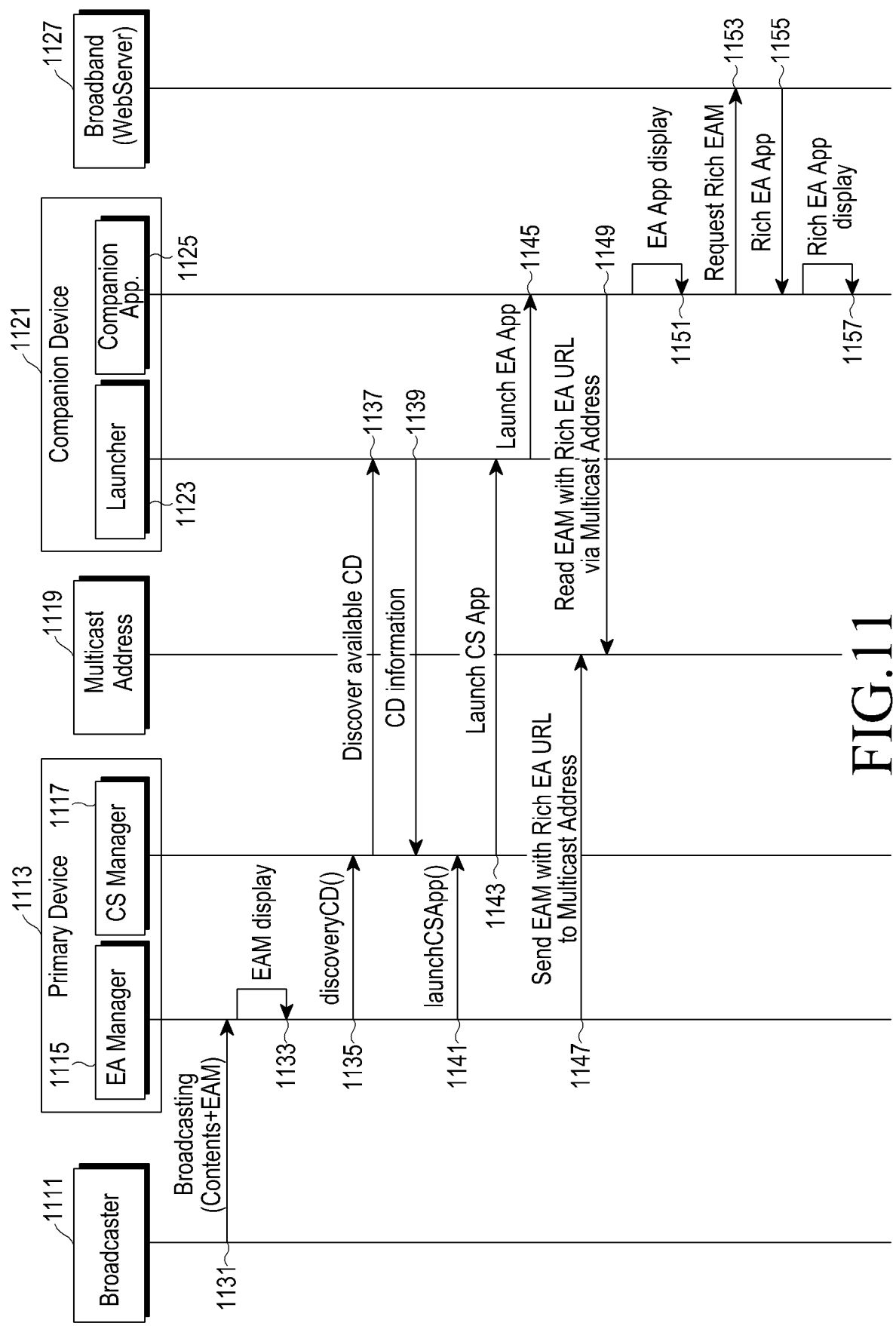
FIG. 11 schematically illustrates still another example of an operation of transmitting an EAM from a PD to a CD in a broadcast system according to an embodiment of the present disclosure.

FIG. 11 schematically illustrates still another example of an operation of transmitting an EAM from a PD to a CD in a broadcast system according to an embodiment of the present disclosure.

Referring to FIG. 11, the broadcast system includes a broadcast center 1111, a PD 1113, a multicast address 1119, a CD 1121, and a web server 1127. The PD 1113 includes an EA Manager 1115 and a CS Manager 1117, and the CD 1121 includes a Launcher 1123 and a Companion App 1125.

An operation of transmitting an EAM from a PD to a CD in FIG. 11 is modification of an operation of transmitting an EAM from a PD to a CD in FIG. 10. That is, in an operation of transmitting an EAM from a PD to a CD in FIG. 10, an EAM is transferred through a web socket server 1018, however, in an operation of transmitting an EAM from a PD to a CD in FIG. 11, an EAM is transferred through the multicast address 1119 instead of the web socket server 1018.

Firstly, a process from operation 1131 to operation 1145 is identical to a process from operation 1027 to operation 1041 in FIG. 10, and a detailed description thereof will be omitted herein.

Meanwhile, the EA Manager 1115 of the PD 1113 transmits an EAM along with a Rich EA URL to the Multicast Address 1119 (at operation 1147). For example, the EA Manager 1115 of the PD 1113 may generate an event of transmitting an EAM along with a Rich EA URL to the Multicast Address 1119. Here, the Multicast Address 1119 uses a predefined address to be recognized by the CD 1121. In FIG. 11, for convenience, the Multicast Address 1119 is shown as a separate device, however, it will be noted that the Multicast Address 1119 is a specific address capable of transmitting/receiving a multicast event and means, for example, an IP address such as 192.168.1.11:992/atsc/EAM.

If the Multicast Address 1119 is not defined previously, an operation of determining the Multicast Address 1119 between the PD 1113 and the CD 1121 needs to be additionally performed as shown in Table 4.

The Companion App 1125 of the CD 1121 checks the Multicast Address 1119, and if there is a received EAM, the Companion App 1125 of the CD 1121 reads the received EAM (at operation 1149).

The Companion App 1125 of the CD 1121 displays the read EAM on a screen of the CD 1121 (at operation 1151).

Operations 1151 to 1157 in FIG. 11 are identical to operations 1051 to 1057 in FIG. 10, and a detailed description thereof will be omitted herein.

Meanwhile, in a case that the PD 1113 executes a CD Application, i.e., in a case corresponding to operations 1143 and 1145 if the Multicast Address 1119 is not defined previously as described above, the PD 1113 transfers a Multicast address which will transmit a Multicast event to the CD 1121. In Table 4, a Multicast Address may be set by including additional information such as Meanwhile, a PD may select whether the PD transmits an EAM to a CD as described in FIG. 10 or the PD transmits the EAM to the CD as described in FIG. 11. In this case, if the PD transfers the EAM with a mMulticast scheme as described in FIG. 11, the PD may execute a CD Application by predetermining to transfer the EAM with the multicast scheme upon executing the CD Application as shown in Table 4.

Although FIG. 11 illustrates still another example of an operation of transmitting an EAM from a PD to a CD in a broadcast system according to an embodiment of the present disclosure, various changes could be made to FIG. 11. For example, although shown as a series of operations, various operations in FIG. 11 could overlap, occur in parallel, occur in a different order, or occur multiple times.

Still another example of an operation of transmitting an EAM from a PD to a CD in a broadcast system according to an embodiment of the present disclosure has been described with reference to FIG. 11, and a specific example situation in a broadcast system according to an embodiment of the present disclosure will be described with reference to FIG. 12.

Figure 12:
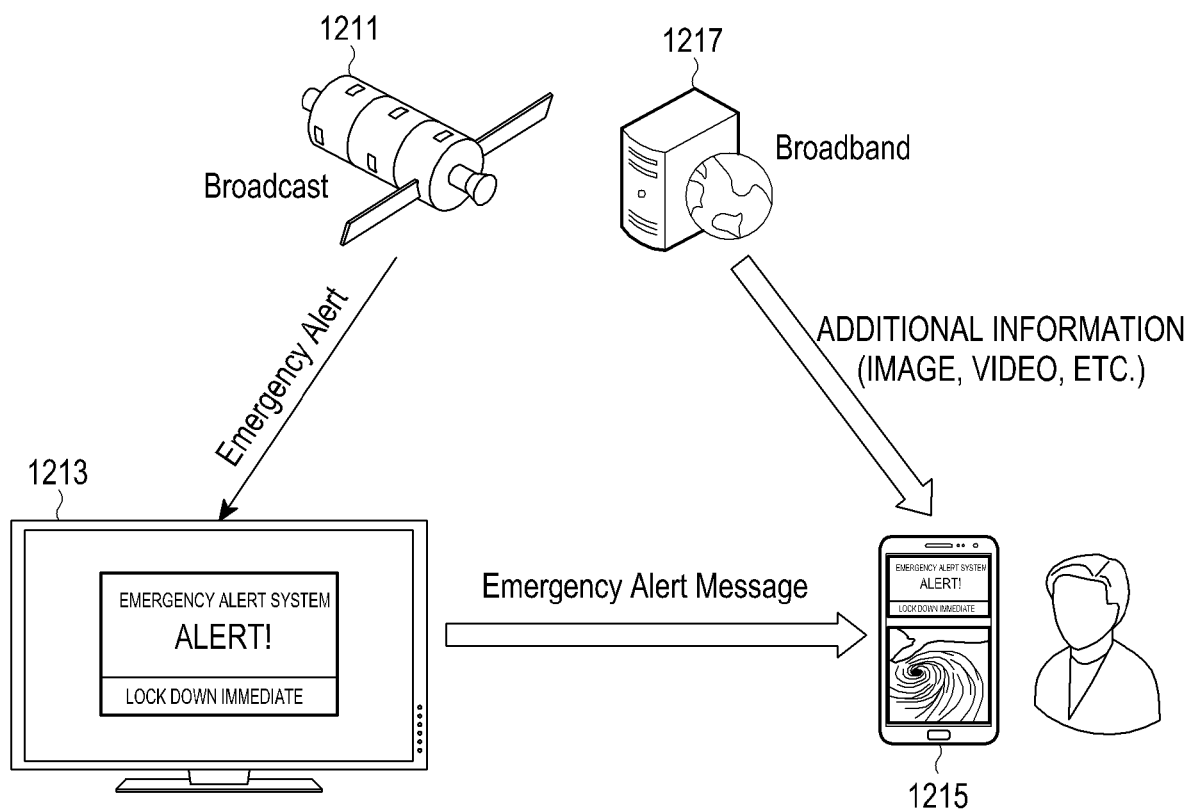
FIG. 12 schematically illustrates a specific example situation in a broadcast system according to an embodiment of the present disclosure.

FIG. 12 schematically illustrates a specific example situation in a broadcast system according to an embodiment of the present disclosure.

Referring to FIG. 12, the broadcast system includes a broadcast center 1211, a PD 1213, a CD 1215, and a web server 1217. The PD 1213 may be, for example, a DTV, and the CD 1215 may be a mobile station.

Referring to FIG. 12, a disaster situation (for example, a typhoon situation) occurs and an EAM transmitted in a broadcast center 1211 is transferred through a broadcast network.

However, in a case that a user does not watch a broadcast provided in a PD 1213 as illustrated in FIG. 12, the user may not the EAM.

Meanwhile, the PD 1213 discovers that there is another device, i.e., a CD 1215, capable of transmitting an EAM within a broadcast network, and transmits an EAM to the CD 1215.

The CD 1215 receives the EAM from the PD 1215, and displays the received EAM. In this case, a user of the CD 1215 checks the received EAM, and may select a link provided in the EAM in order to know an additional situation for a disaster situation.

In this case, more specific information, i.e., a Rich EAM, such as a weather chart, news, and/or the like is received in the CD 1215 from the web server 1217 through an internet network.

A specific example situation in a broadcast system according to an embodiment of the present disclosure has been described with reference to FIG. 12, and an inner structure of a PD in a broadcast system according to an embodiment of the present disclosure will be described with reference to FIG. 13.

Figure 13:
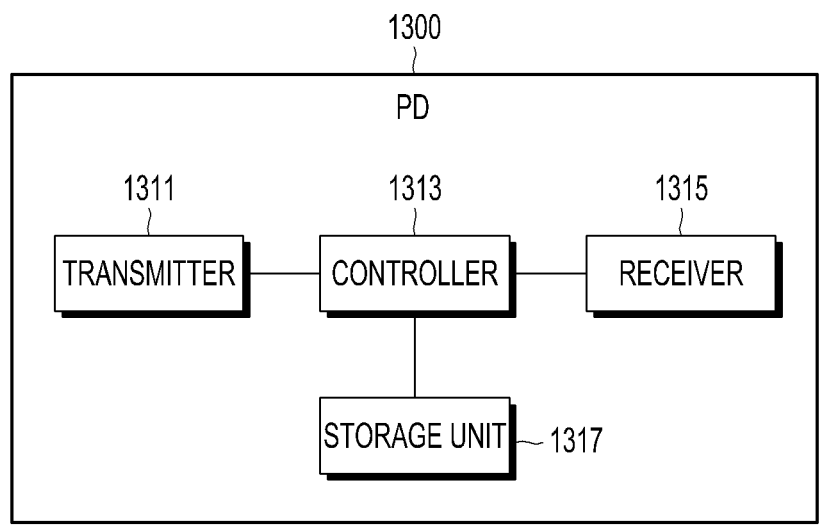
FIG. 13 schematically illustrates an inner structure of a PD in a broadcast system according to an embodiment of the present disclosure.

FIG. 13 schematically illustrates an inner structure of a PD in a broadcast system according to an embodiment of the present disclosure.

Referring to FIG. 13, a PD 1300 includes a transmitter 1311, a controller 1313, a receiver 1315, and a storage unit 1317.

The controller 1313 controls the overall operation of the PD 1300, and more particularly, controls the PD 1300 to perform an operation related to an operation of processing an EAM in a broadcast system according to an embodiment of the present disclosure. The operation related to the operation of processing the EAM in the broadcast system according to an embodiment of the present disclosure which the PD 1300 performs has been described with reference to FIGS. 2 to 12 and a detailed description thereof will be omitted herein.

The transmitter 1311 transmits various signals and various messages to other devices, e.g., a CD and a broadcast center under a control of the controller 1313. The various signals, the various messages, and/or the like received in the transmitter 1311 have been described in FIGS. 2 to 12 and a detailed description thereof will be omitted herein.

The receiver 1315 receives various signals and various messages from other entities, e.g., a CD and a broadcast center under a control of the controller 1313. The various signals, the various messages, and/or the like received in the receiver 1315 have been described in FIGS. 2 to 12 and a detailed description thereof will be omitted herein.

The storage unit 1317 stores various programs and data for the PD 1300 to perform the operation related to the operation of processing the EAM in the broadcast system according to an embodiment of the present disclosure, as described in FIGS. 2 to 12, and data which occurs while performing the operation related to the operation of processing the EAM in the broadcast system according to an embodiment of the present disclosure, as described in FIGS. 2 to 12.

Although the transmitter 1311, the controller 1313, the receiver 1315, and the storage unit 1317 are described as separate units in the PD 1300 in FIG. 13, it is to be understood that the PD 1300 may be implemented with a form into which at least two of the transmitter 1311, the controller 1313, the receiver 1315, and the storage unit 1317 may be incorporated.

The PD 1300 may be implemented with one unit.

An inner structure of a PD in a broadcast system according to an embodiment of the present disclosure has been described with reference to FIG. 13, and an inner structure of a CD in a broadcast system according to an embodiment of the present disclosure will be described with reference to FIG. 14.

Figure 14:
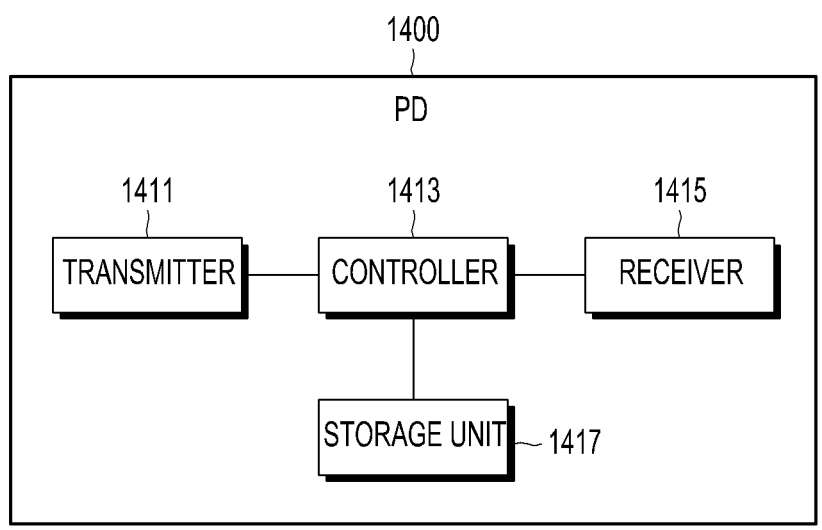
FIG. 14 schematically illustrates an inner structure of a CD in a broadcast system according to an embodiment of the present disclosure.

FIG. 14 schematically illustrates an inner structure of a CD in a broadcast system according to an embodiment of the present disclosure.

Referring to FIG. 14, a CD 1400 includes a transmitter 1411, a controller 1413, a receiver 1415, and a storage unit 1417.

The controller 1413 controls the overall operation of the CD 1400, and more particularly, controls the CD 1400 to perform an operation related to an operation of processing an EAM in a broadcast system according to an embodiment of the present disclosure. The operation related to the operation of processing the EAM in the broadcast system according to an embodiment of the present disclosure which the CD 1400 performs has been described with reference to FIGS. 2 to 12 and a detailed description thereof will be omitted herein.

The transmitter 1411 transmits various signals and various messages to other devices, e.g., a PD and a server under a control of the controller 1413. The various signals, the various messages, and/or the like received in the transmitter 1411 have been described in FIGS. 2 to 12 and a detailed description thereof will be omitted herein.

The receiver 1415 receives various signals and various messages from other entities, e.g., a PD and a server under a control of the controller 1413. The various signals, the various messages, and/or the like received in the receiver 1415 have been described in FIGS. 2 to 12 and a detailed description thereof will be omitted herein.

The storage unit 1417 stores various programs and data for the CD 1400 to perform the operation related to the operation of processing the EAM in the broadcast system according to an embodiment of the present disclosure, as described in FIGS. 2 to 12, and data which occurs while performing the operation related to the operation of processing the EAM in the broadcast system according to an embodiment of the present disclosure, as described in FIGS. 2 to 12.

Although the transmitter 1411, the controller 1413, the receiver 1415, and the storage unit 1417 are described as separate units in the CD 1400 in FIG. 14, it is to be understood that the CD 1400 may be implemented with a form into which at least two of the transmitter 1411, the controller 1413, the receiver 1415, and the storage unit 1417 may be incorporated.

The CD 1400 may be implemented with one unit.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for processing an emergency alert message (EAM) by a primary device (PD) in a broadcast system, the method comprising:

discovering, by a manager in the PD and using a first application program interface (API), a companion device (CD) including a launcher which is responsible for communicating with the manager in the PD and launching a companion application on the CD, wherein the companion application is used for receiving the EAM from the PD and presenting information on the EAM;

triggering the launcher to launch the companion application by using a second API; and transmitting the EAM to the companion application via a websocket server included in the PD, wherein the EAM includes expiration time information indicating an expiration time of the EAM and priority information indicating a priority of the EAM, and wherein an EAM ranking higher in comparison with other EAMs is displayed on the other EAMs in case at least one of the other EAMs is already displayed.

2. The method of claim 1, wherein the EAM is transmitted when a websocket communication is established between the PD and the CD.

3. The method of claim 1, wherein the websocket server of the PD is responsible for handling a websocket communication service between the PD and the CD.

4. The method of claim 1, wherein the EAM includes uniform resource identifier (URI) information to a rich media content used to support the EAM.

5. The method of claim 1, further comprising:

receiving, by the websocket server included in the PD, a request for generating a websocket channel from both an emergency alert (EA) manager in the PD and the companion application; and generating the websocket channel in response to receiving the both requests.

* * * * *